United States Patent
Bentum et al.

(10) Patent No.: US 11,285,623 B2
(45) Date of Patent: Mar. 29, 2022

(54) FIBER OPTIC PAINT ROBOT TOOL

(71) Applicant: Toyota Motor Engineering & Manufacturing North America, Inc., Plano, TX (US)

(72) Inventors: Jared R. Bentum, Brantford (CA); Zayd Qasas, Kitchener (CA); Christopher M. Sheppard, Tillsonburg (CA); Larry G. MacLean, Shakespeare (CA); Bryan R. Hunter, Ingersoll (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 183 days.

(21) Appl. No.: 16/781,276

(22) Filed: Feb. 4, 2020

(65) Prior Publication Data

US 2021/0237287 A1 Aug. 5, 2021

(51) Int. Cl.
*B25J 19/02* (2006.01)
*B25J 15/00* (2006.01)
*B25J 11/00* (2006.01)
*B05B 13/04* (2006.01)
*B25J 13/08* (2006.01)

(52) U.S. Cl.
CPC ......... *B25J 19/025* (2013.01); *B25J 15/0019* (2013.01); *B25J 19/021* (2013.01); *B05B 13/0452* (2013.01); *B25J 11/0075* (2013.01); *B25J 13/086* (2013.01)

(58) Field of Classification Search
CPC .. B25J 11/0075; B25J 13/086; B25J 15/0019; B25J 19/021; B25J 19/025; B05B 13/0452

USPC .......................................................... 901/41
See application file for complete search history.

(56) References Cited

U.S. PATENT DOCUMENTS

| | | | | |
|---|---|---|---|---|
| 4,423,998 A | * | 1/1984 | Inaba | B25J 19/025 414/730 |
| 4,498,414 A | * | 2/1985 | Kiba | B05B 13/0292 118/323 |
| 4,500,065 A | * | 2/1985 | Hennekes | B23K 37/00 248/542 |
| 4,515,479 A | * | 5/1985 | Pryor | G01B 11/00 250/227.21 |
| 4,766,322 A | * | 8/1988 | Hashimoto | B25J 9/1015 250/559.33 |
| 4,988,260 A | | 1/1991 | Kiba et al. | |
| 5,008,555 A | * | 4/1991 | Mundy | G01B 11/00 250/559.22 |

(Continued)

*Primary Examiner* — Jermie E Cozart
(74) *Attorney, Agent, or Firm* — Christopher G. Darrow; Darrow Mustafa PC (57) ABSTRACT

An electrically insulated tool is provided for a paint robot of a robotic painting system. The insulated tool includes an insulated main body having a mounting bracket disposed at a first end of the main body, configured for removably coupling the insulated tool to a paint robot. The tool has an optical sensor system including first and second optical fiber cables, and first and second spaced-apart optic ports coupled to the respective first and second optical fiber cables. The optic ports are configured to provide light communication as a light emitter and a light receiver. An interruption in the light communication between the light emitter and the light receiver indicates a presence of a workpiece component adjacent a detection region of the insulated tool.

20 Claims, 6 Drawing Sheets

(56) References Cited

U.S. PATENT DOCUMENTS

| | | | | |
|---|---|---|---|---|
| 5,176,492 A | * | 1/1993 | Nakamura | B25J 19/021 |
| | | | | 414/730 |
| 5,514,420 A | * | 5/1996 | Tsuzuki | B05B 1/02 |
| | | | | 118/313 |
| 5,782,571 A | * | 7/1998 | Hufford | B25J 15/04 |
| | | | | 403/288 |
| 8,239,063 B2 | | 8/2012 | Clifford et al. | |
| 10,049,443 B2 | | 8/2018 | Bartos et al. | |
| 2009/0204260 A1 | | 8/2009 | Bryne et al. | |
| 2011/0020561 A1 | * | 1/2011 | Tani | B05B 12/08 |
| | | | | 427/458 |
| 2018/0029064 A1 | | 2/2018 | Bania et al. | |

* cited by examiner

FIG. 10

FIBER OPTIC PAINT ROBOT TOOL

TECHNICAL FIELD

The present disclosure generally relates to a tool for a paint robot, and more particularly, to an insulated tool utilizing fiber optics to determine the presence/location of workpiece components and to assist in the appropriate timing for initiating steps in paint application processes.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Automotive vehicle bodies may be assembled as a body-in-white prior to an application of a paint and/or coating. Thus, various movable components of the body-in-white, such as a hinged vehicle door, hood, latch, and deck lid, may need to be moved at some point during the painting process. For example, the body-in-white may travel through a paint booth using a conveyance system that may include stopping points where movable components are repositioned either before or after an application of paint or a coating. Various paint robots may be strategically located in the paint booth, mounted on walls, floors, or platforms, to facilitate such repositioning. The paint robots may use tools on the end of articulated arms to grip and relocate movable components. Sprayer paint robots may then be used for the application of the paint or coating. However, an automated paint process typically requires some type of indication when the relocation of the movable component(s) is complete, such that the painting process can continue. Various robotic painting systems use high voltage when spraying paint. As such, the use of cameras, sensitive electronic detection tools, and/or wires can pose a shock hazard and should be avoided.

Accordingly, there remains a need to provide cost effective detection capabilities in a paint booth, while minimizing use of electronic components.

SUMMARY

This section provides a general summary of the disclosure, and is not a comprehensive disclosure of its full scope or all of its features.

In various aspects, the present teachings provide an electrically insulated tool for a robotic painting system. The insulated tool includes an insulated main body having a mounting bracket disposed at a first end of the main body, configured for removably coupling the insulated tool to a robot. The tool has an optical sensor system including first and second optical fiber cables, and first and second spaced-apart optic ports coupled to the respective first and second optical fiber cables. The optic ports may be configured to provide light communication as a light emitter and a light receiver. An interruption in the light communication between the light emitter and the light receiver indicates a presence of a workpiece component adjacent a detection region of the insulated tool.

In other aspects, the present teachings provide a paint robot for a robotic painting system that includes the electrically insulated tool described herein.

In still other aspects, the present teachings provide a robotic painting system for painting a workpiece with movable components. The robotic painting system includes a paint robot with an electrically insulated tool coupled to an arm of the paint robot. The insulated tool includes an optical sensor system for determining a location of at least one movable component of the workpiece. The optical sensor system includes first and second optical fiber cables. First and second spaced-apart optic ports are provided, coupled to the respective first and second optical fiber cables. The optic ports may be configured to provide light communication as a light emitter and a light receiver. The system may include a controller configured to detect an interruption in the light communication between the light emitter and the light receiver, indicating a presence of the movable component adjacent a detection region of the insulated tool. Once the presence of the movable component is detected, the controller may initiate various painting operations.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides an electrically insulated tool for use with a paint robot of a robotic painting system. The insulated tool can function as both a handle to move components of a workpiece to be painted, and as a detection tool to confirm the location of a component or workpiece. The insulated tool generally includes an insulated main body portion. A mounting bracket may be disposed at a first end of the main body, which is configured for removably coupling the insulated tool to the robot. The tool has an optical sensor system including first and second optical fiber cables, and first and second spaced-apart optic ports coupled to the respective first and second optical fiber cables. One of the optic ports may be configured to provide light communication as a light emitter and the other optic port may be configured as a light receiver. An interruption in the light communication between the light emitter and the light receiver indicates a presence of a workpiece component adjacent a detection region of the insulated tool. Once a workpiece, or component thereof, is detected as being located in an appropriate position, various aspects of the painting process can be initiated, such as the movement of other robots, activation of paint sprayers, and the like.

Figure 1:
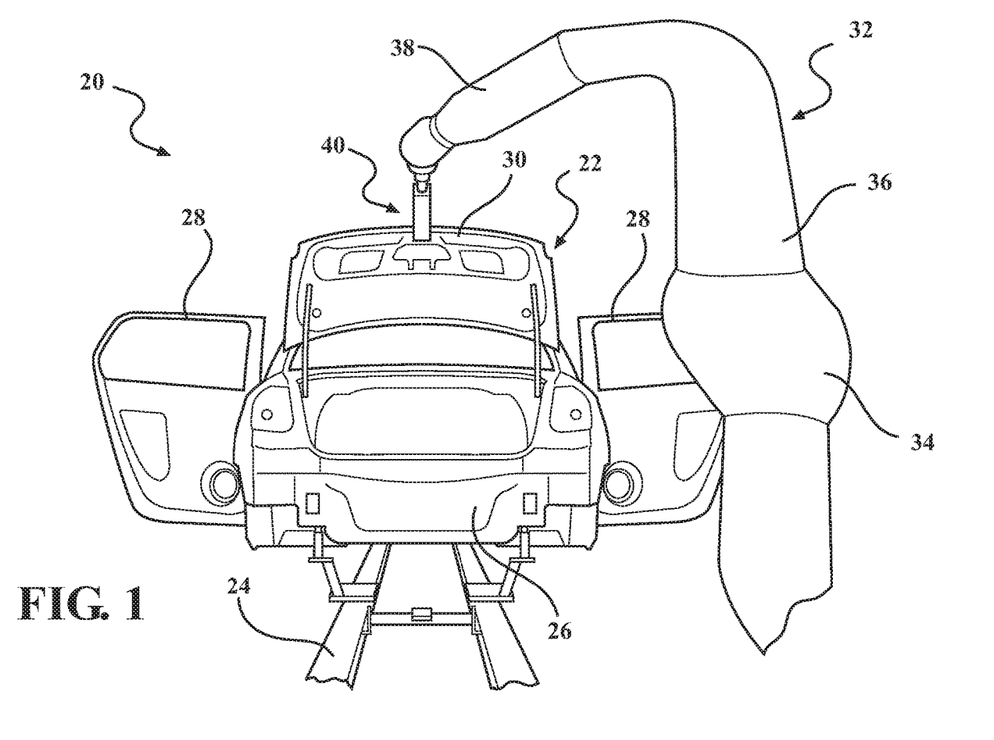
FIG. 1 is a schematic illustration of a body-in-white travelling along a conveyance system within a paint booth of a robotic painting system according to various aspects of the present technology.

FIG. 1 is a schematic illustration of a robotic painting system 20 of the present technology, shown with an exemplary body-in-white 22 travelling along a conveyance system, such as a pair of rails 24. While the figures and descriptions provided herein may specifically refer to an automobile body or portions of a vehicle, such as a body-in-white, the present technology is also relevant to various other types of workpieces (i.e., non-automotive related) having movable components that may require movement or relocation during the painting process. As provided in FIG. 1, the body-in-white 22 may include a central, fixed body 26 with a plurality of movable components coupled to the fixed body 26, for example, with hinges or other permanent or temporary fastening components permitting movement. As specifically shown, the body-in-white 22 includes a pair of doors 28 and a movable deck lid 30. Other common movable components of a body-in-white 22 may include a hood, a hatch, and the like.

Figure 2:
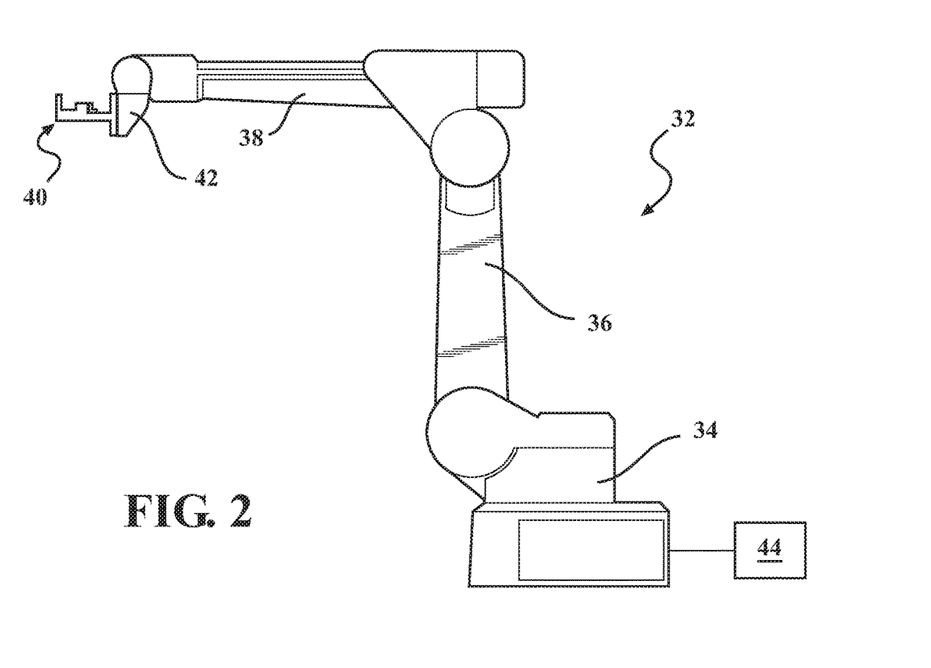
FIG. 2 is a side plan view of an exemplary paint robot including an electrically insulated tool according to various aspects of the present technology.

FIG. 2 is a side plan view of an exemplary paint robot 32 (also shown in FIG. 1) according to various aspects of the present technology. In various examples, the paint robot 32 can be any type of robot useful in a robotic painting system, including but not limited to, an opener robot, a spray robot, and robots that may function as both an opener and spray robot. The paint robot 32 may be a multi-axis automated robot as known in the art, movable in any number of directions and including a base portion 34 coupled to one or more extensions, such as inner and outer moving arm members 36, 38. The base portion 34 may be coupled to a floor, wall, or a platform (not shown). As illustrated, an electrically insulated tool 40 may be coupled to an end region 42 of the outer arm 38. Additional tools (not shown) having other functions may also be used with the paint robot(s). As will be discussed in more detail below, the present technology may use one or more controller, generally referred to by reference number 44. The controller 44 may be a component of the paint robot, for example, disposed within an interior of the robot, or the controller 44 may be external of the paint robot 32, or even external of the paint booth, with a wired or wireless connection. The controller 44 may be configured to coordinate movement of the paint robot 32 as well as coordinate and control operation and movement of the tool 40 generally, as well as the operation of the optic detection system that will be described in more detail below. Multiple controllers may be used, and the controller(s) may be used in combination with other control devices and computer systems.

Figure 3:
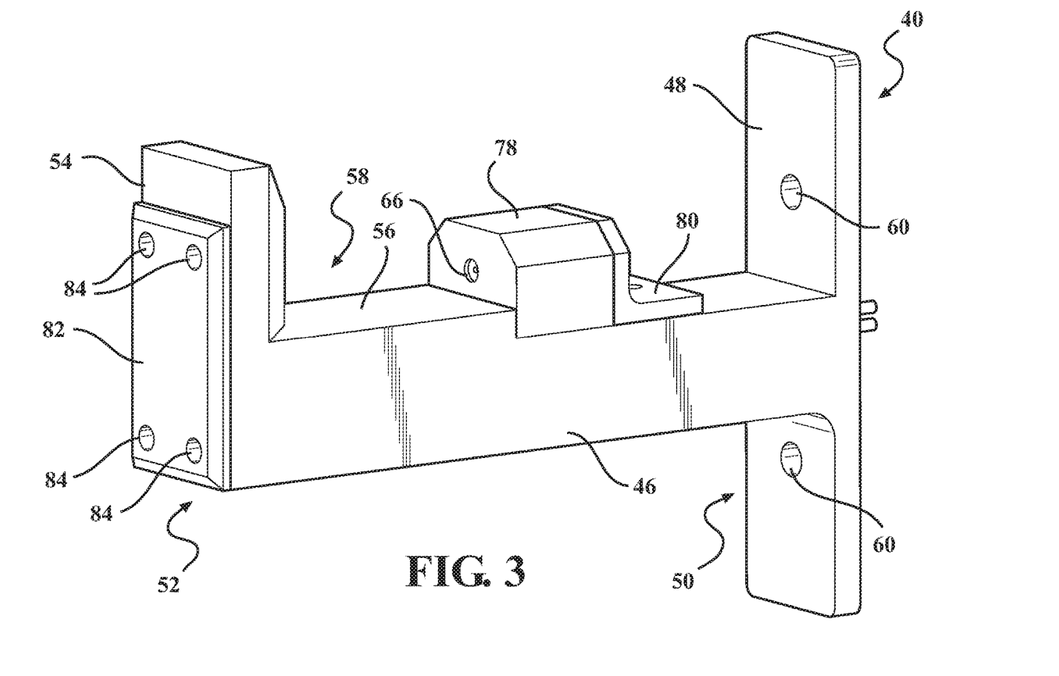
FIG. 3 is a side perspective view of an exemplary electrically insulated tool.

FIG. 3 is a side perspective view of the exemplary electrically insulated tool 40 according to various aspects of the present technology. The tool 40 may include a longitudinally extending main body portion 46 provided with a mounting bracket 48 feature at a first end 50, and elongated extension 54 at a second, opposite end 52. The central region of the main body portion 46 and the elongated extension 54 may cooperate to define a substantially "L"-shaped overall cross-section, extending from the mounting bracket 48 feature of the first end 50. An upper surface/area 56 of the main body portion 46 may be used as a handle portion to contact moving components of the body-in-white 22. As such, the elongated extension 54 may be shaped or provided with angled surfaces 55 (FIG. 4) to direct contact with a workpiece component to the upper surface 56 of the main body 46.

In various aspects, the main body portion 46 is provided as one monolithic component for both increased strength and ease of design. The main body portion 46 is preferably formed of an insulating material, such as nylon, an ultra-high molecular weight polymer, or the like. In various aspects, the main body portion 46 can be an extruded thermoplastic polyethylene. In other aspects, the main body portion 46 can be molded or formed into a desired shape. Various apertures 60 can be defined therein, for example in the bracket 48 feature, to permit fastening to other components. Of course, in still other aspects, the main body portion 46 can include two or more sections suitably joined together.

Figure 4:
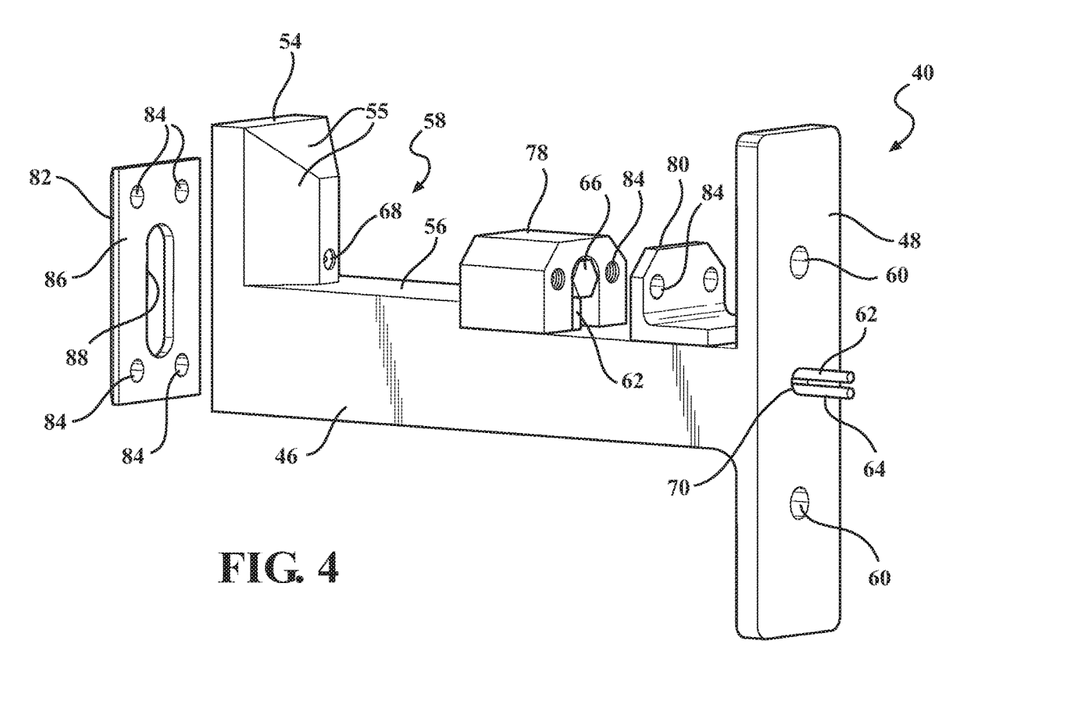
FIG. 4 is first partially exploded side perspective view of the electrically insulated tool of FIG. 3.
Figure 5:
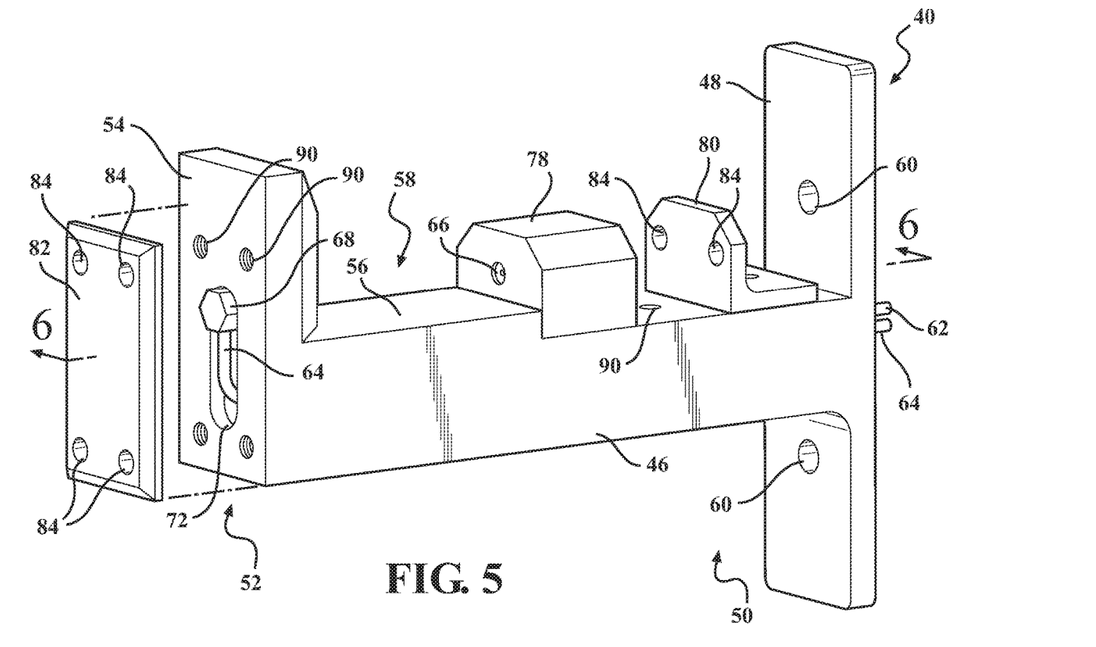
FIG. 5 is second partially exploded side perspective view of the electrically insulated tool of FIG. 3.
Figure 6A:
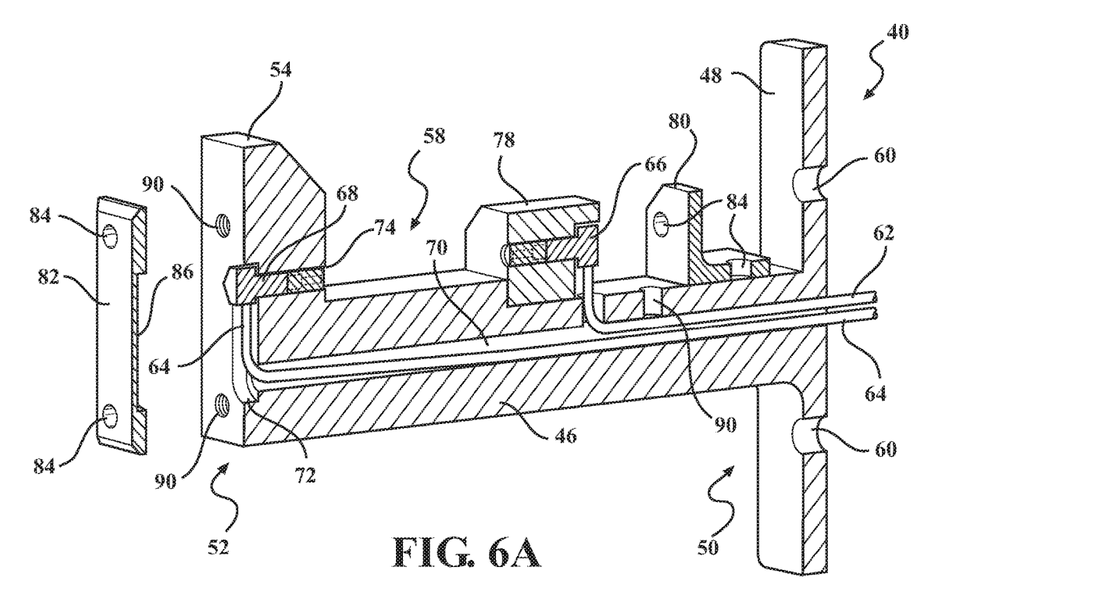
FIG. 6A is a side perspective view of a cross-section of the electrically insulated tool taken along the line 6-6 of FIG. 5.

FIG. 4 is first partially exploded side perspective view of the electrically insulated tool 40 of FIG. 3; and FIG. 5 is second partially exploded side perspective view of the electrically insulated tool of FIG. 3 that is provided at a different angle and point of view in order to show additional features. FIG. 6A is a side perspective view of a cross-section of the electrically insulated tool 40 taken along the line 6-6 of FIG. 5; and FIG. 6B is a plan view of the same cross-section of FIG. 6A.

With collective reference to FIGS. 3-6, in various aspects, the insulated tool 40 includes what is referred to herein as an optical sensor system, used to detect a presence and/or confirm a location of a movable component of the workpiece, or other portion thereof, to be painted. For example, it may be required to verify a location of a deck lid 30, or other movable component, prior to permitting the movement of another robot (to prevent colliding with the workpiece), or to confirm the presence of a component prior to engaging a spraying device or spraying paint robot. In this regard, the tool 40 can be provided with a detection region or a detection area, indicated generally with reference number 58, where an optical sensor system can be useful.

Figure 7:
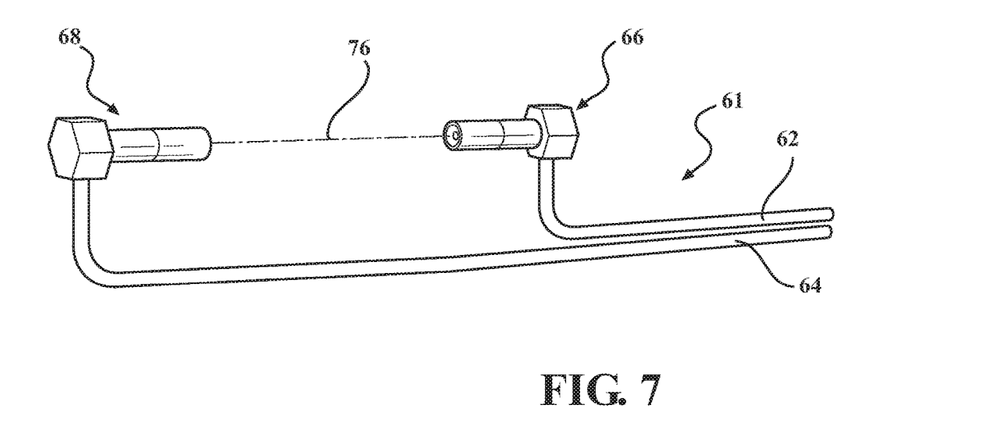
FIG. 7 illustrates exemplary first and second optic ports paired with optical fiber cables.

FIG. 7 illustrates exemplary first and second optic ports paired with respective optical fiber cables. In the examples shown, the optical sensor system 61 includes first and second optical fiber cables 62, 64. First and second spaced-apart optic ports 66, 68, which may also be known as fiber optic connectors, are coupled to the respective first and second optical fiber cables 62, 64, and are configured to provide light communication between one another, one optic port functioning as a light emitter, and the other optic port functioning as a light receiver.

Figure 6B:
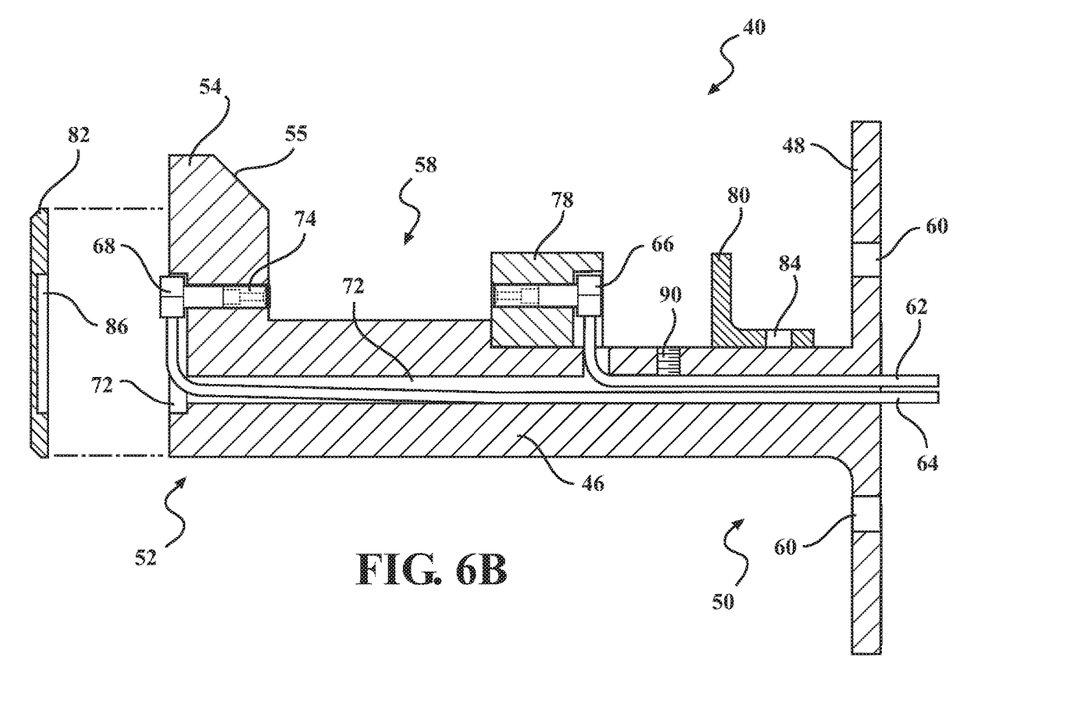
FIG. 6B is a plan view of the cross-section of FIG. 6A.

As best shown in FIGS. 6A and 6B, the main body portion 46 may be provided with an interior passageway 70 extending a distance from the first end 50 to the second end 52. In various aspects, at least a portion of the first and second optical fiber cables 62, 64 may be located within the passageway 70. In various aspects, the passageway 70 may continue along the elongated extension 54, providing a first cavity or opening 72 to house portions of the optical sensor system, including the optical fiber cable 64 and one of the optic ports 68, and a second cavity that may be used to align the optic port 68. Notably, the figures only illustrate a portion of the optical fiber cables 62, 64, which continue to a light source and light sensor. The actual source of the light communication, as well as the light-sensor ultimately receiving the light (and any light amplifier that may be used), may be disposed at a location separate from the robot. For example, the ultimate ends (not shown) of the optical fiber cables 62, 64 may be a light source and light sensor located outside of the paint booth to avoid any potential for a fire hazard. In this regard, the tool 40 may be free of all electronic components and any type of electrical wires and/or connectors, such that it can be referred to as an electrically insulated tool 40.

Typically, the optical fiber cables 62, 64 may have at least three basic components, including: a core, which may have a plurality of fibers to carry the light signals; a cladding that surrounds the core with a lower refractive index and contains the light; and an outer coating to protect the somewhat fragile core and cladding. The optic ports 66, 68 may include appropriate filters, refractors, and lenses as necessary to send and receive the light communication. In various aspects, the lens is made of a chemical resistant material, such as a fluorine resin. The overall length of the optical fiber cables may vary, depending on the overall design of the painting system and location of the robot. The optic ports 66, 68 may be located within the insulated tool 40 or in an appropriate housing (as discussed below) to protect them from dust and debris. The optic ports should generally be in a fixed location, so that they remain aligned with one another in order to permit a continuous beam 76 of light communication (FIG. 7) to be directed between the optic ports 66, 68. With the general operation of the optical sensor system, an interruption in the beam 76 of light communication between the light emitter and the light receiver indicates a presence of a workpiece component adjacent the detection region 58 of the insulated tool. In various aspects, the interruption can be determined by the controller 44, or other suitable sensor. For example, the controller 44, or other computing device, may then use the interruption as a basis for performing and/or timing other operations in the robotic painting system.

In addition to the initial installation, it may be necessary to access the optic ports 66, 68 from time to time, for example, for cleaning or replacement. In the specific design of the tool as shown in FIGS. 3-6, the first optic port 66 may be provided located within an optic port housing 78 that is then coupled to the main body 46 of the insulated tool 40. The optic port housing 78 may shaped to define an appropriate cavity or opening to accept the optic port 66. A cover, which is shown as an L-shaped bracket 80, may be removably coupled to one or both of the main body 46 and the optic port housing 78. With respect to access to the second optic port 68, an end plate 82 may be provided removably coupled to the elongated extension 54 portion of the main body 46. The interior side 86 of the end plate 82 may be provided with a cavity 88 in order to accommodate a shape of the optic port 68. Each of the additional components coupled to the main body 46, including the optic port housing 78, bracket 80, and end plate 82 are preferably formed of an electrically insulating material similar to the main body (as discussed above) and may be provided with suitable apertures 84 configured for use with various types of mechanical fasteners (not shown).

Figure 8:
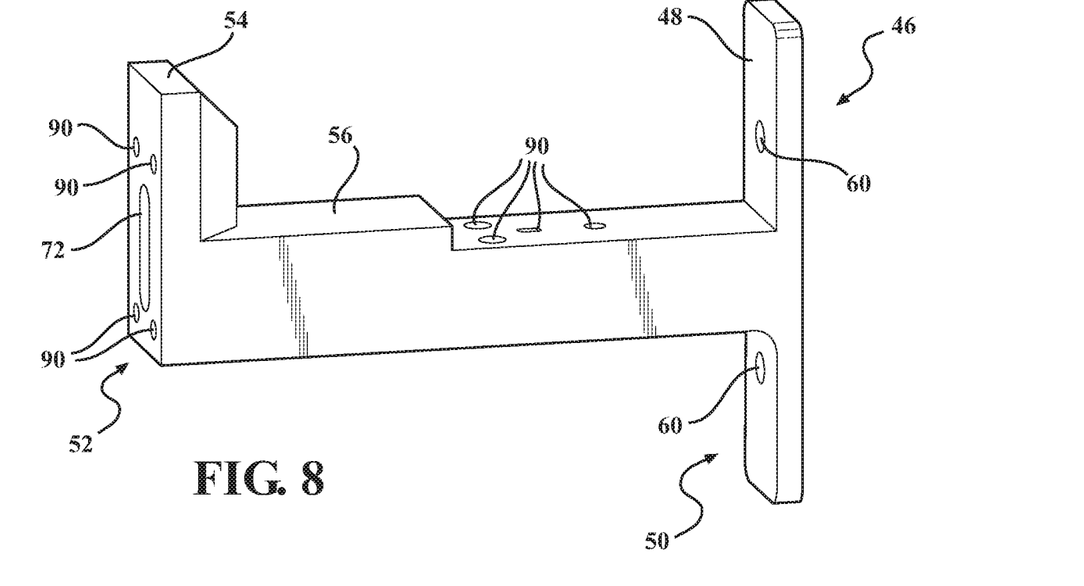
FIG. 8 is a first top-side perspective view of an exemplary main body portion of the insulated tool.
Figure 9:
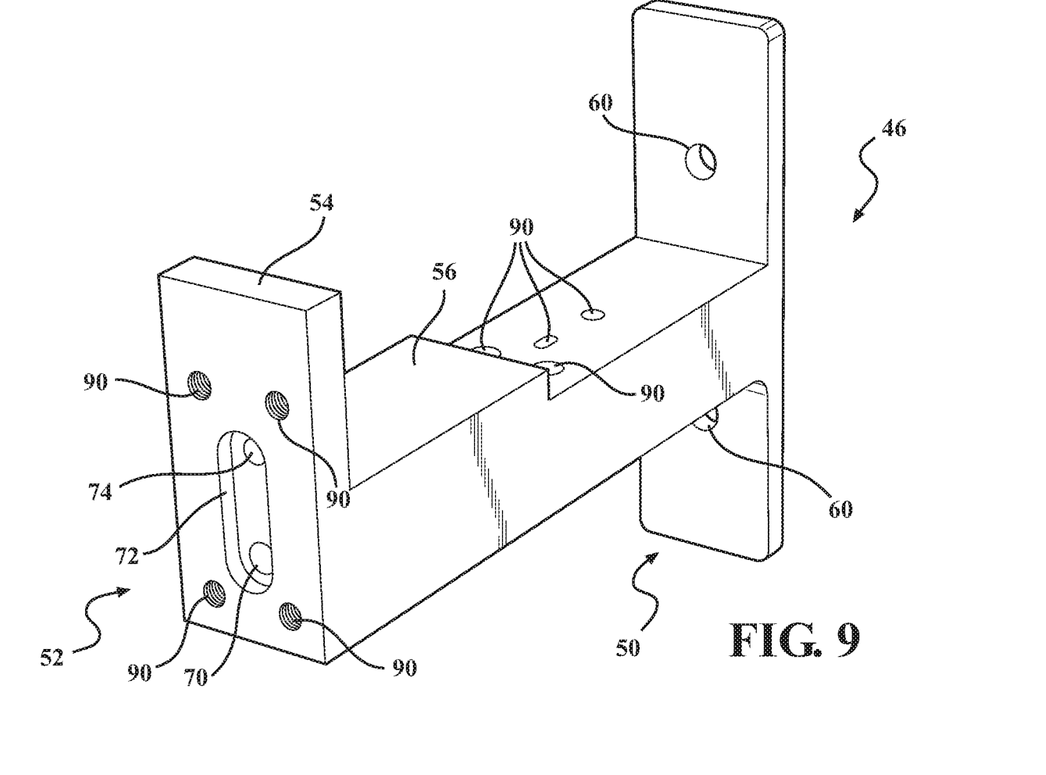
FIG. 9 is a second top-side perspective view of the main body portion provided in FIG. 8.
Figure 10:
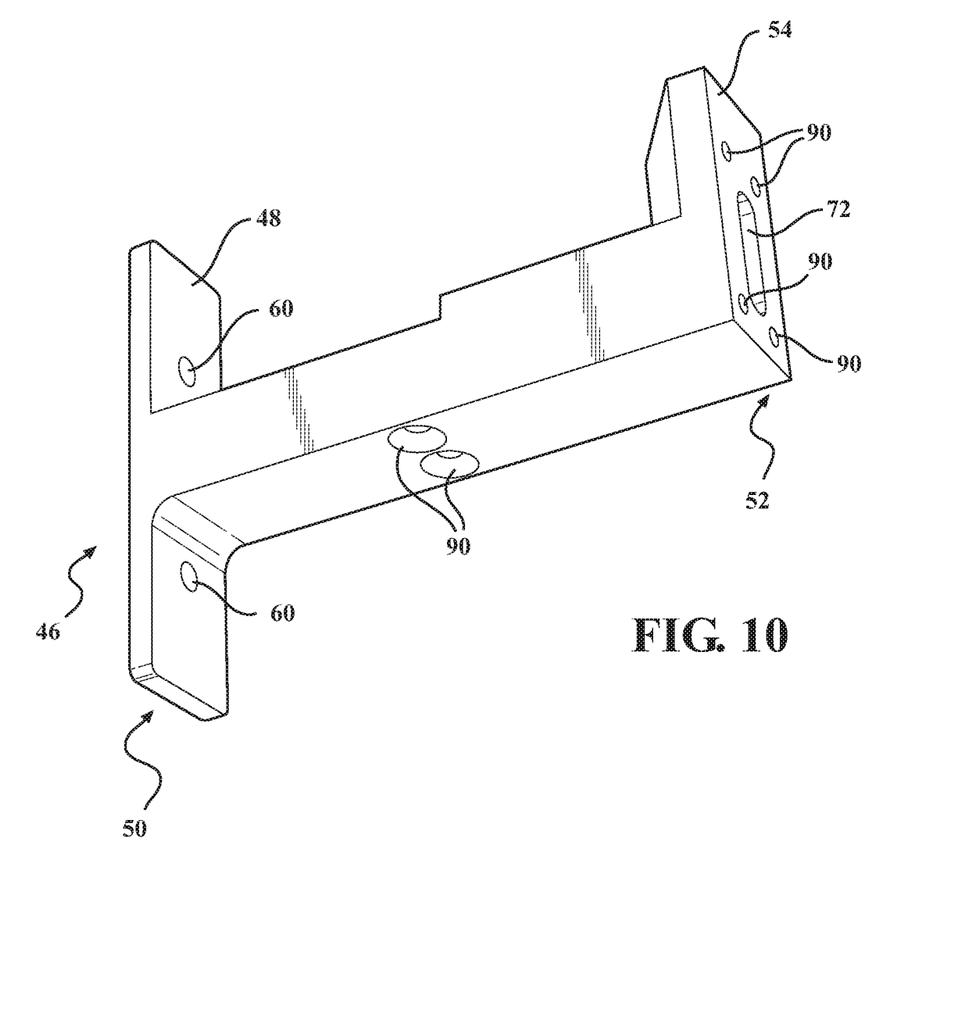
FIG. 10 is a bottom-side perspective view of the main body portion provided in FIG. 8.

FIGS. 8-10 are provided to illustrate further views and details of the exemplary design of main body portion 46. FIG. 8 is a first top-side perspective view of an exemplary main body portion 46 of the insulated tool 40; FIG. 9 is a second top-side perspective view of the main body portion 46 provided in FIG. 8; and FIG. 10 is a bottom-side perspective view of the main body portion 46 provided in FIG. 8. The main body portion 46 may be provided with various apertures 90 for use with mechanical fasteners in order to couple the optic port housing 78, bracket 80, and end plate 82, as discussed above.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. An electrically insulated tool for a robotic painting system, the insulated tool comprising:
   an insulated main body;
   a mounting bracket disposed at a first end of the main body and configured for removably coupling the insulated tool to a paint robot;
   an optical sensor system comprising:
      first and second optical fiber cables;
      first and second spaced-apart optic ports coupled to the respective first and second optical fiber cables, and configured to provide light communication as a light emitter and a light receiver; and
      an optic port housing coupled to the main body and configured to house the first optic port,
      wherein an interruption in the light communication between the light emitter and the light receiver indicates a presence of a workpiece component adjacent a detection region of the insulated tool.

2. The insulated tool according to claim 1, further comprising an L-shaped bracket coupling the optic port housing to the main body.

3. The insulated tool according to claim 1, wherein a second end of the main body defines an extension arm, providing a substantially L-shaped main body.

4. The insulated tool according to claim 3, wherein the extension arm defines a cavity configured to house the second optic port in optical alignment with the first optic port.

5. The insulated tool according to claim 4, further comprising an end plate adjacent the second optic port and fastened to the main body.

6. The insulated tool according to claim 1, further comprising a passageway defined within the main body and extending between the first end of the main body and a second end of the main body.

7. The insulated tool according to claim 6, wherein the first and second optical fiber cables are located within the passageway.

8. The insulated tool according to claim 1, wherein the main body comprises nylon.

9. A robotic painting system for painting a workpiece with movable components, the robotic painting system comprising:
   a paint robot;
   an electrically insulated tool coupled to an arm of the paint robot, the insulated tool including an optical sensor system for determining a location of at least one movable component of the workpiece, the optical sensor system comprising:
      first and second optical fiber cables; and
      first and second spaced-apart optic ports coupled to the respective first and second optical fiber cables, and configured to provide light communication as a light emitter and a light receiver; and
   a controller configured to:
      detect an interruption in the light communication between the light emitter and the light receiver, indicating a presence of the at least one movable component adjacent a detection region of the insulated tool; and
      initiate painting operations upon indicating the presence of the at least one movable component.

10. The robotic painting system according to claim 9, wherein the electrically insulated tool comprises:
   a main body defining a first end and a second end, opposite the first end;
   a mounting bracket disposed at the first end of the main body and configured for removably coupling the insulated tool to the arm of the paint robot; and
   a passageway defined within the main body, extending between the first end and the second end and configured to house the first and second optical fiber cables.

11. The robotic painting system according to claim 9, wherein the workpiece comprises a body-in-white, and the at least one movable component is a hinged vehicle component.

12. The robotic painting system according to claim 11, wherein the hinged vehicle component is one of a hood, a hatch, a door, and a deck lid.

13. An electrically insulated tool for a robotic painting system, the insulated tool comprising:
   an insulated main body;
   a mounting bracket disposed at a first end of the main body and configured for removably coupling the insulated tool to a paint robot;
   an optical sensor system comprising:
      first and second optical fiber cables; and
      first and second spaced-apart optic ports coupled to the respective first and second optical fiber cables, and configured to provide light communication as a light emitter and a light receiver,
      wherein a second end of the main body defines an extension arm providing a substantially L-shaped main body, and an interruption in the light communication between the light emitter and the light receiver indicates a presence of a workpiece component adjacent a detection region of the insulated tool.

14. The insulated tool according to claim 13, further comprising an optic port housing coupled to the main body and configured to house the first optic port.

15. The insulated tool according to claim 13, further comprising an L-shaped bracket coupling the optic port housing to the main body.

16. The insulated tool according to claim 13, wherein the extension arm defines a cavity configured to house the second optic port in optical alignment with the first optic port.

17. The insulated tool according to claim 16, further comprising an end plate adjacent the second optic port and fastened to the main body.

18. The insulated tool according to claim 13, further comprising a passageway defined within the main body and extending between the first end of the main body and a second end of the main body.

19. The insulated tool according to claim 18, wherein the first and second optical fiber cables are located within the passageway.

20. The insulated tool according to claim 13, wherein the main body comprises nylon.

* * * * *